(12) United States Patent
Lakrout et al.

(10) Patent No.: US 9,428,389 B2
(45) Date of Patent: Aug. 30, 2016

(54) VITREOUS CARBON COMPOSITION

(71) Applicant: Blue Cube IP LLC, Midland, MI (US)

(72) Inventors: Hamed Lakrout, Lake Jackson, TX (US); Maurice J. Marks, Lake Jackson, TX (US); Ludovic Valette, Perrysburg, OH (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 14/391,734

(22) PCT Filed: May 17, 2013

(86) PCT No.: PCT/US2013/041564
§ 371 (c)(1),
(2) Date: Oct. 10, 2014

(87) PCT Pub. No.: WO2013/188051
PCT Pub. Date: Dec. 19, 2013

(65) Prior Publication Data
US 2015/0093321 A1  Apr. 2, 2015

Related U.S. Application Data

(60) Provisional application No. 61/660,479, filed on Jun. 15, 2012.

(51) Int. Cl.
*C01B 31/02* (2006.01)
*C04B 35/524* (2006.01)
*C04B 35/626* (2006.01)
*C04B 35/634* (2006.01)

(52) U.S. Cl.
CPC .............. *C01B 31/02* (2013.01); *C04B 35/524* (2013.01); *C04B 35/6269* (2013.01); *C04B 35/63452* (2013.01); *C04B 2235/602* (2013.01); *C04B 2235/6022* (2013.01); *C04B 2235/6025* (2013.01); *C04B 2235/6027* (2013.01); *C04B 2235/658* (2013.01); *C04B 2235/6562* (2013.01); *C04B 2235/662* (2013.01)

(58) Field of Classification Search
CPC ...................................................... C01B 31/02
See application file for complete search history.

(56) References Cited

U.S. PATENT DOCUMENTS 2,924,580 A    2/1960  Phillips
5,665,636 A *  9/1997  Saito ................... C04B 35/524
                                                    117/88

* cited by examiner

*Primary Examiner* — Stuart Hendrickson
(74) *Attorney, Agent, or Firm* — Polsinelli PC

(57) ABSTRACT

A process for preparing a vitreous carbon including the steps of: (I) providing a curable low viscosity liquid carbon precursor formulation comprising (a) at least one aromatic epoxy resin; and (b)(i) at least one aromatic co-reactive curing agent, (b) (ii) at least one catalytic curing agent, or (b)(iii) a mixture thereof; wherein the liquid precursor composition has a neat viscosity of less than 10,000 mPa·s at 25° C. prior to adding optional components, prior to curing, and prior to carbonizing; and wherein the liquid precursor composition being cured has a carbon yield of at least 35 weight percent as measured in the absence of optional components; (II) curing the liquid formulation from step (I) to form a cured product wherein the cured product has a carbon yield of at least 35 weight percent as measured in the absence of optional components; (III) carbonizing the cured product from step (II) to form a carbonized composition; and (IV) purifying the carbonized product from step (III) to form a vitreous carbon composition; and a vitreous carbon prepared by the above process.

12 Claims, No Drawings

VITREOUS CARBON COMPOSITION

FIELD

The present invention is related to a vitreous carbon composition and a process for manufacturing the vitreous carbon composition.

BACKGROUND

There are various carbonaceous materials known in the art. For example, "vitreous" or "glassy" carbon is an amorphous carbon that is gas-impermeable material; and because of its amorphous structure, glassy carbon generates a significantly lower number of particles than graphite. Also, glassy carbon has very low thermal conductivity. Glassy carbon is also very resistant to corrosion by acid and alkaline agents. These properties make glassy carbon an ideal material for various applications including semiconductor processing, electrical, mechanical and chemical analysis industries.

Heretofore, several known processes have been used to prepare vitreous carbon for various applications. For example, JP49027266B discloses that a vitreous carbon can be produced by baking and carbonizing a synthetic resin by heating the resin above its decomposition temperature. Other processes for preparing a vitreous carbon are disclosed in JP63064906A; U.S. Pat. No. 4,938,829; JP8157205A; JP2000095566A; U.S. Patent Application Publication No. US20030161781A1; U.S. Pat. No. 6,624,108; and U.S. Pat. No. 7,608,367.

None of the above known process utilize an epoxy resin formulation having a low neat viscosity and after curing said formulation providing a high carbon yield; and wherein the composition can be readily purified or treated to provide a very low ash content in the final product.

SUMMARY

In accordance with the present invention, a high carbon yield low viscosity epoxy formulation that can be cured and carbonized to form a vitreous carbon composition is produced.

The present invention is directed to a process for producing a vitreous carbon composition or product. For example, one embodiment of the present invention is directed to a process for producing a vitreous carbon product including the steps of:

(I) providing a curable low viscosity liquid carbon precursor formulation comprising (a) at least one aromatic epoxy resin; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa·s at 25° C. prior to adding optional components, prior to curing, and prior to carbonizing; and wherein the liquid precursor composition being cured has a carbon yield of at least 35 wt % as measured in the absence of optional components:

(II) curing the liquid formulation from step (I) to form a cured product; wherein the cured product has a carbon yield of at least 35 weight percent as measured in the absence of optional components;

(III) carbonizing the cured product from step (II) to form a carbonized composition; and (IV) treating the carbonized product from step (III) to form a vitreous carbon composition.

Another embodiment of the present invention is directed to a vitreous carbon prepared by the above process.

DETAILED DESCRIPTION

In its broadest scope, a vitreous carbon of the present invention may be manufactured by curing, carbonizing, and purifying a curable formulation to produce a vitreous carbon material or article. Accordingly, in carrying out the process of the present invention, the first step is to prepare or provide a curable composition or formulation.

For example, in one embodiment, the curable low viscosity liquid carbon precursor formulations, and processes for producing such formulations, useful in the present invention may include for example any of the formulations and processes described in co-pending U.S. Provisional Patent Application No. 61/660,417.

In another embodiment, examples of the curable low viscosity liquid carbon precursor formulation useful in the present invention may include the curable compositions or formulations described in U.S. Provisional Patent Application Ser. No. 61/660,397 and U.S. Provisional Patent Application Ser. No. 61/660,403.

"Carbonizing", "carbonization", or "pyrolyzing" herein means removing a significant portion of non-carbon elements from a composition by heating the composition at a temperature of 10° C./minute from 25° C. to 1,000° C. under an inert atmosphere such as nitrogen.

"Carbon yield" with reference to a carbonized composition herein means the percent weight remaining from a cured sample of a composition treated at 10° C./minute from 25° C. to 1,000° C. under an inert atmosphere such as nitrogen as measured in the absence of optional components.

For example, the curable low viscosity liquid carbon precursor formulation useful for preparing a vitreous carbon includes (a) at least one aromatic epoxy resin; and (b)(i) at least one aromatic co-reactive curing agent, (b)(ii) at least one catalytic curing agent, or (b)(iii) a mixture thereof; wherein the liquid carbon precursor formulation has a neat viscosity of less than 10,000 mPa·s at 25° C., prior to adding optional components, prior to curing, and prior to carbonizing; and wherein the liquid carbon precursor formulation, upon being cured and being carbonized, has a carbon yield of at least 35 weight percent as measured in the absence of optional components.

The aromatic epoxy resin compound, component (a), useful in the curable liquid carbon precursor formulation can be one aromatic epoxy resin compound or a combination of two or more epoxy resin compounds, wherein at least one of the epoxy resin compounds is an aromatic epoxy resin. For example, one preferred embodiment of the aromatic epoxy resin useful in the present invention may be a divinylarene dioxide.

In one embodiment, the divinylarene dioxide useful in the curable liquid carbon precursor composition of the present invention may include any of the divinylarene dioxides described in U.S. patent application Ser. No. 13/133,510.

In another embodiment, the divinylarene dioxide useful in preparing the curable liquid carbon precursor composition of the present invention may include, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, and tetrahydronaphthalene. Homologously bonded (substituted) benzenes may consist of biphenyl, and diphenylether.

The divinylarene dioxide used for preparing the formulations of the present invention may be illustrated generally by chemical Structures I-IV as follows:

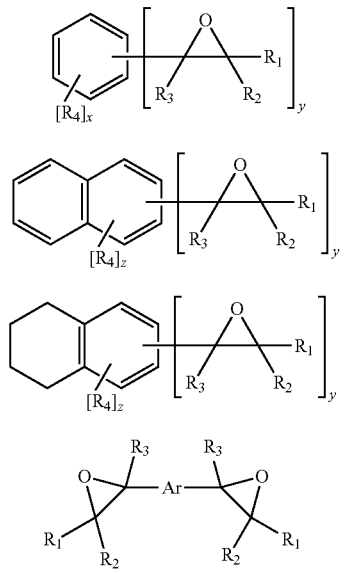

Structure I

Structure II

Structure III

Structure IV

In the above Structures I, II, III, and IV of the divinylarene dioxide useful in the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide useful in the present invention may be produced, for example, by the process described in U.S. Patent Provisional Application Ser. No. 61/141,457, filed Dec. 30, 2008, by Marks et al. In another embodiment, the divinylarene dioxides useful in the present invention are disclosed in, for example, U.S. Pat. No. 2,924,580.

In still another embodiment, the divinylarene dioxide useful in the present invention may include, for example, divinylbenzene dioxide (DVBDO), divinylnaphthalene dioxide, divinylbiphenyl dioxide, divinyldiphenylether dioxide, or mixtures thereof.

In one preferred embodiment of the present invention, the divinylarene dioxide used in the curable liquid carbon precursor composition of the present invention can be for example DVBDO. Divinylarene dioxides such as for example DVBDO are a class of diepoxides which have a relatively low liquid viscosity but a higher rigidity and crosslink density than conventional epoxy resins.

In another preferred embodiment, the divinylarene dioxide compound useful in the present invention includes, for example, a DVBDO as illustrated by the following chemical formula of Structure V:

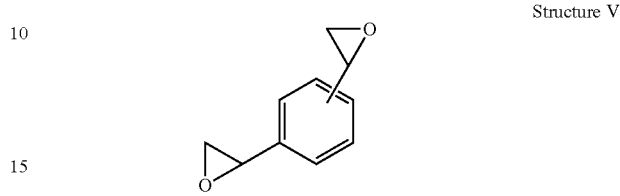

Structure V

The chemical formula of the above DVBDO compound may be as follows: $C_{10}H_{10}O_2$; the molecular weight of the DVBDO is 162.2; and the elemental analysis of the DVBDO is: C, 74.06; H, 6.21; and O, 19.73 with an epoxide equivalent weight of 81 g/mol.

Structure VI below illustrates another embodiment of a preferred chemical structure of the DVBDO useful in the present invention:

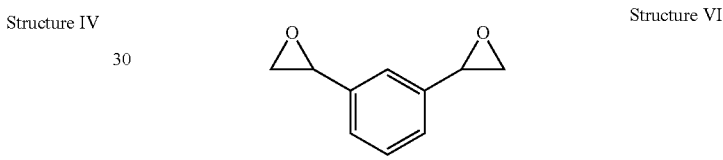

Structure VI

Structure VII below illustrates still another embodiment of a preferred chemical structure of the DVBDO useful in the present invention:

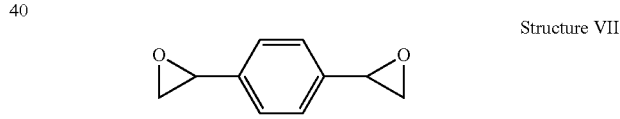

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from 9:1 to 1:9 ratio of meta (Structure VI) to para (Structure VII) isomers. The present invention preferably includes as one embodiment a range of from 6:1 to 1:6 ratio of Structure VI to Structure VII, and in other embodiments the ratio of Structure VI to Structure VII may be from 4:1 to 1:4 or from 2:1 to 1:2.

In yet another embodiment of the present invention, the divinylarene dioxide may contain quantities (such as for example less than 20 wt %) of substituted arenes and/or arene oxides. The amount and structure of the substituted arenes and/or arene oxides mixed with a divinylarene dioxide composition depends on the process used in the preparation of the divinylarene precursor which is, in turn, used to prepare the divinylarene dioxide. For example, the divinylarene precursor such as divinylbenzene (DVB) can be prepared by the dehydrogenation of diethylbenzene (DEB), and the resultant product composition may contain quantities of ethylvinylbenzene (EVB) and DEB. During the dehydrogenation reaction of DEB, wherein an oxidant such as hydrogen peroxide, the EVB present in the reaction mixture can react with hydrogen peroxide to produce ethylvinylbenzene oxide while DEB remains unchanged. The presence of ethylvinylbenzene oxide and DEB in the divinylarene dioxide can increase the epoxide equivalent weight of the divinylarene dioxide to a value greater than that of a pure divinylarene dioxide compound.

In one embodiment, the divinylarene dioxide, (for example DVBDO) useful in the present invention comprises a low viscosity liquid epoxy resin. For example, the viscosity of the divinylarene dioxide used in the present invention ranges generally from 0.001 Pa·s to 0.1 Pa·s in one embodiment, from 0.01 Pa·s to 0.05 Pa·s in another embodiment, and from 0.01 Pa·s to 0.025 Pa·s in still another embodiment, at 25° C.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from 6 to 10 rotational degrees of freedom in one embodiment, from 6 to 9 rotational degrees of freedom in another embodiment, and from 6 to 8 rotational degrees of freedom in still another embodiment.

The aromatic epoxy resin useful in the present invention curable liquid carbon precursor composition may include a wide variety of aromatic epoxy resins known in the art other than the divinylarene dioxide. The aromatic epoxy resin may be may be substituted or unsubstituted. The aromatic epoxy resin may be monomeric or polymeric. The aromatic epoxy resin may include a single aromatic epoxy resin or may include a combination of two or more aromatic epoxy resins.

For example, the aromatic epoxy resin useful in the present invention may include, one or more aromatic epoxy resin compounds described in Pham, H. Q. and Marks, M. J., *Epoxy Resins*, the Kirk-Othmer Encyclopedia of Chemical Technology; John Wiley & Sons, Inc.: online Dec. 4, 2004 and in the references therein; in Lee, H. and Neville, K., *Handbook of Epoxy Resins*, McGraw-Hill Book Company, New York, 1967, Chapter 2, pages 2-1 to 2-33, and in the references therein; May, C. A. Ed., *Epoxy Resins: Chemistry and Technology*, Marcel Dekker Inc.: New York, 1988 and in the references therein; and in U.S. Pat. No. 3,117,099.

Some of the aromatic epoxy resin compounds useful in the present invention include for example epoxy compounds based on reaction products of polyfunctional phenols, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of p-aminophenols. Other suitable epoxy compounds known in the art include for example reaction products of epichlorohydrin with o-cresol novolacs, hydrocarbon novolacs, and, phenol novolacs. The epoxy compound may also be selected from commercially available products such as for example, D.E.R. 331®, D.E.R.332, D.E.R. 354, D.E.R. 580, D.E.N. 425, D.E.N. 431, or D.E.N. 438 epoxy resins available from The Dow Chemical Company.

As aforementioned, the curable liquid carbon precursor composition can be prepared by admixing (a) the at least one aromatic epoxy resin described above with (b)(i) at least one aromatic co-reactive curing agent, or (b)(ii) at least one catalytic curing agent, or (b)(iii) a mixture of the at least one aromatic co-reactive curing agent and the at least one catalytic curing agent.

An "aromatic co-reactive curing agent" herein means an aromatic compound bearing functional groups which react with the epoxide of the aromatic epoxy resin to effect curing by condensation of the epoxide groups of the aromatic epoxy resin with the functional groups of the aromatic co-reactive curing agent.

A "catalytic curing agent" herein means a compound which reacts with the epoxide group of the aromatic epoxy resin to initiate curing of the aromatic epoxy resin by epoxide homopolymerization.

The at least one aromatic co-reactive curing agent or the at least one catalytic curing agent of the carbon precursor composition of the present invention can include for example one or a combination of two or more of the above curing agents. The aromatic co-reactive curing agent and the catalytic curing agent of the carbon precursor composition useful in the present invention may be selected from any aromatic co-reactive curing agents or any catalytic curing agents for epoxy resins known in the art.

For example, the aromatic co-reactive curing agent (also referred to as a hardener or cross-linking agent) useful in the present invention may be any aromatic compound having an active group being reactive with the reactive epoxy group of the epoxy resin. The chemistry of such curing agents is described in the previously referenced books on epoxy resins. The aromatic co-reactive curing agent useful in the present invention includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, and phenolic-terminated epoxy resins.

In one preferred embodiment, diaminodiphenylsulfone and their isomers, aminobenzoates, various acid anhydrides, phenol-novolac resins and cresol-novolac resins, for example, may be used in the present invention, but the present invention is not restricted to the use of these compounds.

The aromatic co-reactive curing agent of choice may depend on the aromatic epoxy resin used in the formulation. Generally, the aromatic co-reactive curing agent useful in the present invention may be selected from, for example, but are not limited to, phenols, benzoxazines, aromatic anhydrides, aromatic amines, aromatic carbodiimides, aromatic polyesters, aromatic polyisocyanates, and mixtures thereof. In the cases of a divinylarene dioxide used as the aromatic epoxy resin the aromatic co-reactive curing agent can also include a phenol, diphenol, or polyphenol.

In a preferred embodiment, the curing agent of the liquid carbon precursor formulation comprises a phenolic compound such as a monophenol, a diphenol, a polyphenol, or mixtures thereof; and more preferably, the monophenol comprises para-cresol.

In one embodiment, the at least one aromatic co-reactive curing agent may include one or more of aromatic amines such as methylenedianiline (MDA), toluenediamine (TDA), diethyltoluenediamine (DETDA), diaminodiphenylsulfone (DADS), polyphenols such as bisphenol A, bisphenol F, 1,1-bis(4-hydroxyphenyl)-ethane, hydroquinone, resorcinol, catechol, tetrabromobisphenol A, novolacs such as phenol novolac, bisphenol A novolac, hydroquinone novolac, resorcinol novolac, naphthol novolac, anhydrides such as phthalic anhydride, trimellitic anhydride, and mixtures thereof.

In a preferred embodiment, the aromatic co-reactive curing agent blended with the at least one aromatic epoxy resin such as for example a divinylarene dioxide in preparing the curable carbonized composition liquid precursor of the present invention may comprise, for example, any compound adapted for providing a carbon yield of greater than 35 percent when the compound is subjected to carbonization or pyrolysis. In one embodiment, the aromatic co-reactive curing agent adapted for providing a high carbon yield may include for example a phenol such as p-cresol or m-cresol or other phenol, and mixtures thereof. One preferred embodiment includes a phenol compound useful for the curable composition of the present invention, such as for example p-cresol.

Generally, the ratio r of epoxide equivalents from the aromatic epoxy resin to the co-reactive groups of the aromatic co-reactive curing agent adapted for providing a high carbon yield used in the present invention, may be for example, from 0.1 to 10 in one embodiment, from 0.2 to 8 in another embodiment; from 0.4 to 6 in still another embodiment; and from 1 to 5 in yet another embodiment. When r is greater than 1.0, after curing the excess epoxide may remain unreacted or may be reacted into the thermoset network. When the aromatic epoxy resin is a divinylarene dioxide and the aromatic co-reactive curing agent is a phenol, r is defined as explained in co-pending U.S. Provisional Patent Application No. 61/660,397.

The catalytic curing agent useful in the present invention may include, for example, Bronsted acids, Lewis acids, Lewis bases, alkali bases, Lewis acid-Lewis base complexes, quaternary ammonium compounds, quaternary phosphonium compounds, or mixtures thereof. Suitable examples of Bronsted acids include sulfuric acid, sulfonic acids, perchloric acid, phosphoric acid, partial esters of phosphoric acid, and mixtures thereof. One suitable example of a Lewis acid includes boron trifluoride. Suitable examples of Lewis bases include tertiary amines, imidazoles, amidines, substituted ureas and mixtures thereof. One suitable example of an alkali base includes potassium hydroxide. One suitable example of a Lewis acid-Lewis base complex includes boron trifluoride-ethylamine complex. One suitable example of a quaternary ammonium compound is benzyltrimethylammonium hydroxide. One suitable example of a quaternary phosphonium compound is tetrabutylphosphonium hydroxide.

In addition, when an aromatic epoxy resin such as a divinylarene dioxide is used, the catalytic curing agent useful in the present invention can include the latent catalysts described in co-pending U.S. Provisional Patent Application No. 61/660,403.

In preparing the curable liquid carbon precursor composition of the present invention, optional compounds can be added to the curable liquid carbon precursor composition including for example at least one curing catalyst. A "curing catalyst" or "cure catalyst" herein means a compound used to facilitate the reaction of the at least one aromatic epoxy resin with the aromatic co-reactive curing agent compound. The curing catalyst may be selected based on the epoxy resin employed and the aromatic co-reactive curing agent employed in the present invention composition.

In one illustrative embodiment when the epoxy resin is for example a divinylarene dioxide and the curing agent is for example a phenol, the optional curing catalyst useful in the present invention may include at least one acid compound-related cure catalyst to facilitate the reaction of the divinylarene dioxide compound with the phenol. In one embodiment, the catalyst useful in the present invention may include, for example, any one or more of the catalysts described in U.S. Provisional Patent Application Ser. No. 61/556,979, such as for example Bronsted acids (e.g., CYCAT® 600 commercially available from Cytec), Lewis acids, and mixtures thereof. In another embodiment, the catalysts may include for example a latent alkylating ester such as for example, any one or more of the catalysts described in WO 9518168.

In another embodiment, the latent alkylating ester cure catalyst may include for example the esters of sulfonic acids such as methyl p toluenesulfonate (MPTS), ethyl p-toluenesulfonate (EPTS), and methyl methanesulfonate (MMS); esters of α-halogenated carboxylic acids such as methyl trichloroacetate and methyl trifluoroacetate; and esters of phosphonic acids such as tetraethylmethylene-diphosphonate; or any combination thereof. One preferred embodiment of the cure catalyst used in the present invention may include for example MPTS. Other curing catalysts useful in the present invention may include for example those described in co-pending U.S. Provisional Patent Application No. 61/660,397.

Generally, the amount of catalytic curing agent or optional cure catalyst used in the present invention, may be for example, from 0.01 wt % to 20 wt % in one embodiment, from 0.1 wt % to 10 wt % in another embodiment; from 0.1 wt % to 5 wt % in still another embodiment; and from 0.1 wt % to 3 wt % catalyst in yet another embodiment. The use of lower levels of catalytic curing agent or optional cure catalyst would reduce reactivity and would result in less crosslinked network; and the use of higher levels of catalytic curing agent or optional cure catalyst would be uneconomical.

The curable formulation of the present invention may include as an optional compound at least one other second epoxy compound different from the above-described first aromatic epoxy resin such as DVBDO. For example, the second epoxy compound may include one epoxy compound or may include a combination of two or more epoxy compounds. The epoxy compounds useful in the present invention are those compounds may include a wide variety of epoxy compounds known in the art. For example, the epoxy compound may be saturated or unsaturated, aliphatic, cycloaliphatic, aromatic or heterocyclic and may be substituted. The epoxy compound may be monomeric or polymeric.

For example, the formulation of the present invention may include, one or more epoxy compounds known in the art such as epoxy compounds described in Pham, H. Q. and Marks, M. J., Epoxy Resins, the Kirk-Othmer Encyclopedia of Chemical Technology; John Wiley & Sons, Inc.: online Dec. 4, 2004; in Lee, H. and Neville, K., *Handbook of Epoxy Resins*, McGraw-Hill Book Company, New York, 1967, Chapter 2, pages 2-1 to 2-33, and in the references therein; May, C. A. Ed., *Epoxy Resins: Chemistry and Technology*, Marcel Dekker Inc.: New York, 1988; and in U.S. Pat. No. 3,117,099.

Some of the epoxy compounds useful as the second epoxy resin may include for example epoxy compounds based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy compounds known in the art include for example reaction products of epichlorohydrin with o-cresol novolacs, hydrocarbon novolacs, and, phenol novolacs. The epoxy compound may also be selected from commercially available products such as for example, D.E.R. 331®, D.E.R.332, D.E.R. 354, D.E.R. 580, D.E.N. 425, D.E.N. 431, D.E.N. 438, D.E.R. 736, or D.E.R. 732 epoxy resins available from The Dow Chemical Company.

When a single aromatic epoxy resin is used herein, or when an aromatic epoxy resin is used in combination or blend with one or more other non-aromatic, aliphatic, or cycloaliphatic epoxy compounds, the total amount of the epoxy resin used in the formulation useful in the present invention may range generally from 0.5 weight percent (wt %) to 100 wt % in one embodiment, from 1 wt % to 99 wt % in another embodiment, from 2 wt % to 98 wt % in still another embodiment, and from 5 wt % to 95 wt % in yet another embodiment, depending on the fractions of the other ingredients in the reaction product composition.

Other optional compounds that may be added to the curable liquid carbon precursor composition of the present invention may include compounds that are normally used in curable resin formulations known to those skilled in the art. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

Other optional compounds that may be added to the curable liquid carbon precursor composition may include, for example, a solvent to lower the viscosity of the formulation even further from the initial viscosity of the composition; other epoxy resins different from the aromatic epoxy resin (e.g., aliphatic glycidyl ethers or cycloaliphatic epoxy resins); other curing agents different from aromatic co-reactive curing agents and catalytic curing agents; fillers; pigments; toughening agents; flow modifiers; adhesion promoters; diluents; stabilizers; plasticizers; curing catalysts; catalyst de-activators; flame retardants; coal tar pitch; petroleum pitch; aromatic hydrocarbon resins; carbon nanotubes; graphene; carbon black; carbon fibers, or mixtures thereof.

In one preferred embodiment, the liquid precursor formulation includes an additional epoxy resin different from the aromatic epoxy resin, an additional curing agent different from the aromatic co-reactive curing agent and the catalytic curing agent, a filler, a reactive diluent, a flexibilizing agent, a processing aide, a toughening agent, or a mixture thereof.

Generally, the amount of the other optional compounds, when used in the present invention, may be for example, from 0 wt % to 90 wt % in one embodiment, from 0.01 wt % to 80 wt % in another embodiment; from 0.1 wt % to 65 wt % in still another embodiment; and from 0.5 wt % to 50 wt % curing agent in yet another embodiment.

One embodiment for preparing the above-described curable high carbon yield low neat viscosity liquid carbon precursor formulation or composition includes, for example the step of admixing (a) at least one aromatic epoxy resin; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa·s at 25° C. prior to adding optional components, prior to curing, and prior to carbonizing; and wherein the liquid precursor composition being cured has a carbon yield of at least 35 wt % as measured in the absence of optional components; and (c) optionally, at least one cure catalyst or other optional ingredients as desired.

The compounds used in making the curable liquid carbon precursor composition are beneficially low viscosity materials that mix without special effort. For example, the preparation of the curable liquid carbon precursor composition of the present invention is easily achieved by blending the ingredients of the composition with a magnetic stir bar mixer or a pail mixer. For example, the curable liquid carbon precursor composition can be mixed with a standard pail mixer at from 1 rpm to 200 rpm.

The required and optional components or ingredients of the curable liquid carbon precursor composition or formulation of the present invention are typically mixed and dispersed at a temperature enabling the preparation of an effective curable composition having the desired balance of properties for a particular application. For example, the temperature during the mixing of the components may be generally from −10° C. to 100° C. in one embodiment, and from 0° C. to 50° C. in another embodiment. Lower mixing temperatures help to minimize reaction of the resin and hardener components to maximize the pot life of the formulation.

As one illustrative embodiment and not be limited thereby, a divinylbenzene dioxide, a p-cresol, a cure catalyst, and other desirable and optional additives, for example an additional epoxy resin, can be admixed together to form the curable liquid carbon precursor composition of the present invention.

The preparation of the curable liquid carbon precursor composition of the present invention, and/or any of the steps thereof, may be a batch or a continuous process. The mixing equipment used in the process may be any vessel and ancillary equipment well known to those skilled in the art.

The curable liquid carbon precursor composition of the present invention, prior to adding any optional compounds, prior to curing, and prior to carbonizing, has a neat viscosity of less than about 10,000 mPa·s at 25° C. For example, the curable liquid carbon precursor composition without optional compounds and prior to curing and carbonizing has a neat viscosity of generally less than 10,000 mPa·s in one embodiment, from 1 mPa·s to 10,000 mPa·s in another embodiment, from 1 mPa·s to 5,000 mPa·s in yet another embodiment, from 5 mPa·s to 3,000 mPa·s in still another embodiment, and from 10 mPa·s to 1,000 mPa·s in yet another embodiment, at 25° C. In other embodiments, the neat viscosity of the curable liquid carbon precursor composition prior to curing can include 1 mPa·s or greater, 5 mPa·s or greater, or 10 mPa·s or greater. In other embodiments, the neat viscosity of the curable liquid carbon precursor composition prior to curing can include 10,000 mPa·s or lower, 5,000 mPa·s or lower, 3,000 mPa·s or lower or 1,000 mPa·s or lower.

One advantage of the low viscosity of the curable liquid carbon precursor composition of the present invention is that the low viscosity enables a processable amount of resin pick-up by the carbon matrix such as carbon fibers.

In addition to having a low viscosity, the curable liquid carbon precursor composition, prior to curing, has a surface tension that can be from 10 mN/m to 70 mN/m at 25° C. in one embodiment, from 20 mN/m to 60 mN/m in another embodiment, and from 30 mN/m to 60 mN/m in still another embodiment. In other embodiments, the surface tension of the curable liquid carbon precursor composition prior to curing can include 10 mN/m or greater, 20 mN/m or greater, or 30 mN/m or greater. In other embodiments, the surface tension of the curable liquid carbon precursor composition prior to curing can include 70 mN/m or lower or 60 mN/m or lower.

Furthermore, the curable liquid carbon precursor composition of the present invention may have a wettability property sufficient to easily and efficiently wet the surface of a carbon substrate or member, that is, the liquid precursor has affinity between a liquid and a surface translating into the ability of the liquid to spread on the surface of the substrate.

Generally, the wetting ability, i.e. the wettability, of the curable liquid carbon precursor composition in terms of contact angle on the surface of a substrate, for example of a droplet on a surface of a substrate can be a minimum of less than 90 degrees, preferably from zero degrees to 90 degrees, more preferably from 5 degrees to 90 degrees, even more preferably from 10 degrees to 60 degrees, and most preferably from 15 degrees to 40 degrees at ambient temperature as measured on the surface of a substrate or a fiber in accordance to the method disclosed in ASTM Method D5725-99. In other embodiments, the contact angle of the curable liquid carbon precursor composition prior to curing can include 0 degrees or greater, 5 degrees or greater, 10 degrees or greater, or 15 degrees or greater. In other embodiments, the contact angle of the curable liquid carbon precursor composition prior to curing can include 90 degrees or lower, 60 degrees or lower, or 40 degrees or lower.

The substrates used in the present invention in which a contact angle may be measured with reference to the liquid composition can vary and may include for example graphite, glass, ceramic, and metals.

The first step of producing a vitreous carbon product of the present invention is providing a curable formulation of the present invention as described above. Upon preparing the above curable formulation as described above, the formulation can be further processed to form a vitreous carbon product.

The process of the present invention includes curing the aforementioned curable liquid carbon precursor composition to form a cured material or cured product. The curing of the curable liquid carbon precursor composition may be carried out at a predetermined temperature and for a predetermined period of time sufficient to cure the liquid carbon precursor composition. For example, the temperature of curing the curable liquid carbon precursor composition or formulation may be generally from 10° C. to 350° C. in one embodiment; from 25° C. to 200° C. in another embodiment, from 100° C. to 190° C. in still another embodiment; and from 125° C. to 175° C. in yet another embodiment. In other embodiments, the temperature of curing can include 10° C. or greater, 25° C. or greater, 100° C. or greater, or 125° C. or greater. In other embodiments, the temperature of curing can include 350° C. or lower, 200° C. or lower, 190° C. or lower, or 175° C. or lower.

Generally, the curing time for curing the curable liquid carbon precursor composition or formulation may be chosen between 1 minute to 90 days in one embodiment, 2 minutes to 7 days, 3 minutes to 1 day, 5 minutes to 8 hours, to between 7 minutes to 4 hours in another embodiment, and between 10 minutes to 2 hours in still another embodiment. In other embodiments, the time of curing can include 1 minute or greater, 2 minutes or greater, 3 minutes or greater, 5 minutes or greater, 7 minutes or greater, or 10 minutes or greater. In other embodiments, the time of curing can include 90 days or lower, 7 days or lower 1 day or lower, 8 hours or lower, 4 hours or lower, or 2 hours or lower.

The divinylarene dioxide useful in the present invention such as DVBDO, which is one embodiment of the epoxy resin component of the curable composition of the present invention, may be used as the sole resin to form the epoxy matrix in the final curable liquid carbon precursor composition or formulation; or the divinylarene dioxide resin may be used in combination with another epoxy resin that is different from the divinylarene dioxide as the epoxy component in the final curable liquid carbon precursor composition or formulation.

Upon curing the curable liquid carbon precursor composition having a neat viscosity of less than 10,000 mPa·s at 25° C., the resultant cured composition is adapted for being carbonized or further processed. Upon curing the curable liquid carbon precursor composition, the cured composition comprises a solid body which can be formed or shaped into a desired preform structure before carbonizing the structure.

One of the beneficial consequences of producing the cured material from curing the curable liquid carbon precursor composition described above includes producing a cured product having a carbon yield of generally at least 35 wt %. For example, the carbon yield of the cured product, as measured by thermogravimetric analysis (TGA), generally may be from 35 wt % to 95 wt % in one embodiment, from 40 wt % to 90 wt % in another embodiment, from 45 wt % to 85 wt % in still another embodiment, or from 50 wt % to 80 wt % in yet another embodiment, based on the total weight of the cured composition. In other embodiments, the carbon yield of the cured product can include 35 wt % or greater, 40 wt % or greater, 45 wt % or greater, or 50 wt % or greater. In other embodiments, the carbon yield of the cured product can include 95 wt % or lower, 90 wt % or lower, 85 wt % or lower, or 80 wt % or lower.

The resulting cured material (i.e., the cross-linked product) produced from curing the curable liquid carbon precursor composition described above forms a cured preform precursor that can be carbonized in accordance with the present invention to further form a carbonized composition or carbonized product with several improved properties over conventional epoxy resins which have been cured and carbonized.

In one embodiment, the curing step described above can be carried out concurrently with the carbonizing step in whole or in part. In another embodiment, the carbonizing step can be carried out as a separate step from the curing step.

For example, the process of the present invention can include the step of carbonizing the cured material in an inert atmosphere such as nitrogen or vacuum at a predetermined temperature and for a predetermined period of time sufficient to carbonize the cured material and provide a carbonized composition having a carbon yield of greater than 35 wt %. For example, the temperature of carbonizing the cured material may be generally from 350° C. to 4,000° C. in one embodiment; from 400° C. to 3,500° C. in another embodiment; from 500° C. to 3,000° C. in still another embodiment; and from 800° C. to 2000° C. in yet another embodiment.

Generally, the time of carbonizing the cured material may depend on the amount of carbon material, the size of the carbon article, and the complexity of the carbon article. In one illustrative embodiment, the time of carbonizing the cured material can be chosen for example in the range from 1 minute to 90 days in one embodiment, from 30 minutes to 7 days in another embodiment, and from 1 hour to 24 hours in still another embodiment.

Carbonizing the cured material as described herein above provides a carbonized composition or carbonized product having several advantages over the prior art. For example, one advantage of the carbonized composition of the present invention is that the carbonized composition has a low amount of impurities. The impurities can include for example metals and non-metals. The presence of impurities in the carbonized composition may introduce deleterious effects in the properties of the resulting carbonized material in its various applications and therefore the impurities in the carbonized product should be avoided.

The treatment of the carbonized product prepared above and therefore forming a purified or treated vitreous carbon product or composition includes passing a gas through at least a portion of the carbonized product. The gas may include for example a halogen gas such as chlorine.

Generally, the treating step is carried out at a high temperature such as for example of from 800° C. to 3,000° C. for a period of time of less than one week and preferably less than 24 hours; and at a pressure of from 0.1 bar to 10 bar pressure. The treating step advantageously removes at least a portion of impurities present in the carbonized product. Preferably the after treating the carbonized product with a gas, the metal impurity level of the carbonized product is less than 200 ppm in one embodiment; and from 0.1 ppm to 200 ppm. The metal impurities (also referred to as ash content) commonly found in the carbon materials used herein include for example Al, Cu, and other metals.

In one preferred embodiment, the vitreous carbon produced from the carbonized composition described above includes producing a purified or treated product having an ash content of generally of less than 5 ppm. For example, the ash content of the vitreous carbon generally may be from 0.1 ppm to 5 ppm in one embodiment, from 1 ppm to 5 ppm in another embodiment, based on the total weight of the vitreous carbon composition. In other embodiments, the ash content of the vitreous carbon can include 0.1 ppm or greater, or 1 ppm or greater. In other embodiments, the ash content of the vitreous carbon can include 5 ppm or lower, 4 ppm or lower, 3 ppm or lower, or 1 ppm or lower.

The treating step of the present invention process also advantageously removes a portion of hydrogen present in the carbonized product. Still in other embodiments, the process includes the treating the carbonized product to reduce at least a portion of the porosity in the carbonized product.

The vitreous carbon of the present invention including a carbon/graphite material may be used to manufacture various vitreous carbon articles such as for example a semiconductor, and a cathode.

EXAMPLES

The following examples further illustrate the present invention in detail but are not to be construed to limit the scope thereof.

Various terms and designations used in the following examples are explained herein as follows:

"DVBDO" stands for divinylbenzene dioxide.
"MPTS" stands for methyl p-toluenesulfonate.
"TGA" stands for thermogravimetric analysis.

The following standard analytical equipments and methods are used in the examples:

Measurement of Viscosities of the Precursor Composition

The viscosity of the curable liquid carbon precursor formulation of the present invention was measured on a torsional rheometer TA Instruments AR2000 equipped with a 50 mm diameter smooth stainless steel upper plate and a bottom Peltier plate assembly controlling both the temperature of the liquid sample and the normal force acting on the surface of the Peltier plate. About 2 mL of the formulation was deposited on the bottom plate before the top plate was lowered onto the liquid formulation until a gap of 300 microns between the two plates was achieved. The top plate was then rotated at a nominal rate of 0.001 rad/s while the temperature of the bottom plate was raised from 25° C. to 65° C. at a rate of 10° C./minute. Viscosity was automatically calculated by the TA software and reported as a function of the temperature.

Measurement of Carbon Yield:

Carbon yield (% C) was determined by thermogravimetric analysis under nitrogen using a TA Instruments Q5000 Thermogravimetric Analyzer with a temperature ramp of 10° C./minute from 25° C. to 1,000° C. The "% C" is defined as the wt % residue of carbon at the completion of the above analysis as measured in the absence of optional components in the composition.

Example 1

In this Example 1, a vitreous carbon material of the present invention is produced by first preparing a curable formulation (DVBDO95/p-cresol/MPTS at 85/14/1 weight ratio, respectively) and then the curable formulation is cured according to a regular cure cycle as follows:

| Temp (° C.) | 60 | 80 | 100 | 110 | 120 | 130 | 140 | 150 | 160 | 175 | 200 | 220 |
|---|---|---|---|---|---|---|---|---|---|---|---|---|
| Time (minutes) | 15 | 15 | 30 | 15 | 15 | 15 | 15 | 15 | 15 | 15 | 15 | 15 |

The above cured system is then carbonized in a TGA Q500 furnace at a temperature of from 25° C. to 1,000° C. at 10° C./minute. The carbon yield is about 62%.

The carbonized product prepared above is then treated by heating the carbonized product at a temperature of at least about 1,000° C. and passing a chlorine gas through the carbonized product to form a high purity vitreous carbon composition having a low ash content of less than 200 ppm.

The invention claimed is:

1. A process for preparing a vitreous carbon comprising the steps of:
   (I) providing a curable low viscosity liquid carbon precursor formulation comprising (a) at least one aromatic epoxy resin; and (b)(i) at least one aromatic co-reactive curing agent, (b)(ii) at least one catalytic curing agent, or (b)(iii) a mixture thereof; wherein the liquid precursor composition has a neat viscosity of less than 10,000 mPa·s at 25° C. prior to adding optional components, prior to curing, and prior to carbonizing; and wherein the liquid precursor composition being cured has a carbon yield of at least 35 weight percent as measured in the absence of optional components;
   (II) curing the liquid formulation from step (I) to form a cured product; wherein the cured product has a carbon yield of at least 35 weight percent as measured in the absence of optional components;
   (III) carbonizing the cured product from step (II) to form a carbonized composition; and (IV) treating the carbonized product from step (III) to reduce the ash content present in the carbonized product to less than 200 ppm to form a vitreous carbon composition.

2. The process of claim 1, wherein the treating step (IV) comprises passing a gas through at least a portion of the carbonized product.

3. The process of claim 2, wherein the gas comprises a halogen gas.

4. The process of claim 3, wherein the halogen gas is chlorine.

5. The process of claim 1, wherein the treating step (IV) is carried out at a temperature of from 800° C. to 3,000° C.

6. The process of claim 1, wherein the treating step (IV) removes at least a portion of ash present in the carbonized product.

7. The process of claim 6, wherein the carbonized product after the treating step (IV) has an ash content of less than 200 ppm.

8. The process of claim 1, wherein the treating step (IV) removes a portion of hydrogen present in the carbonized product.

9. The process of claim 1, wherein the treating step (IV) reduces a portion of the porosity in the carbonized product.

10. The process of claim 1, including a step of shaping the cured product of step (II) prior to carbonizing.

11. The process of claim 1, including a step of molding the liquid carbon precursor formulation prior to curing and carbonizing.

12. The process of claim 11, wherein the molding step comprises injecting, casting, coating, extruding, pouring, spraying and mixtures thereof prior to curing and carbonizing.

* * * * *